United States Patent [19]

Hewitt

[11] Patent Number: 5,249,505
[45] Date of Patent: Oct. 5, 1993

[54] POPPET RETAINER FOR CONTROL VALVE

[75] Inventor: Wayne A. Hewitt, LaPorte, Ind.

[73] Assignee: Allied-Signal Inc., Morristown, N.J.

[21] Appl. No.: 885,710

[22] Filed: May 18, 1992

[51] Int. Cl.$^5$ .............................................. F15B 7/10
[52] U.S. Cl. .................................................. 91/376 R
[58] Field of Search ........................... 91/369.1–369.4, 91/376 R

[56] References Cited

U.S. PATENT DOCUMENTS 3,499,288  3/1970  Randol ............................... 91/376 R
4,116,218  9/1978  Acre et al. ......................... 91/376 R

FOREIGN PATENT DOCUMENTS 2417384  11/1975  Fed. Rep. of Germany .
2638134   4/1990  France .

Primary Examiner—Edward K. Look
Assistant Examiner—F. Daniel Lopez
Attorney, Agent, or Firm—Leo H. McCormick, Jr.; Ken C. Decker

[57] ABSTRACT

A retainer for locating a poppet member of a control valve in a bore while positioning a return spring connected to an input member within bore to direct substantially turbulent free air through slots in the retainer to a poppet member for distribution to a chamber when an input force moves a plunger of the control valve away from the poppet member.

6 Claims, 1 Drawing Sheet

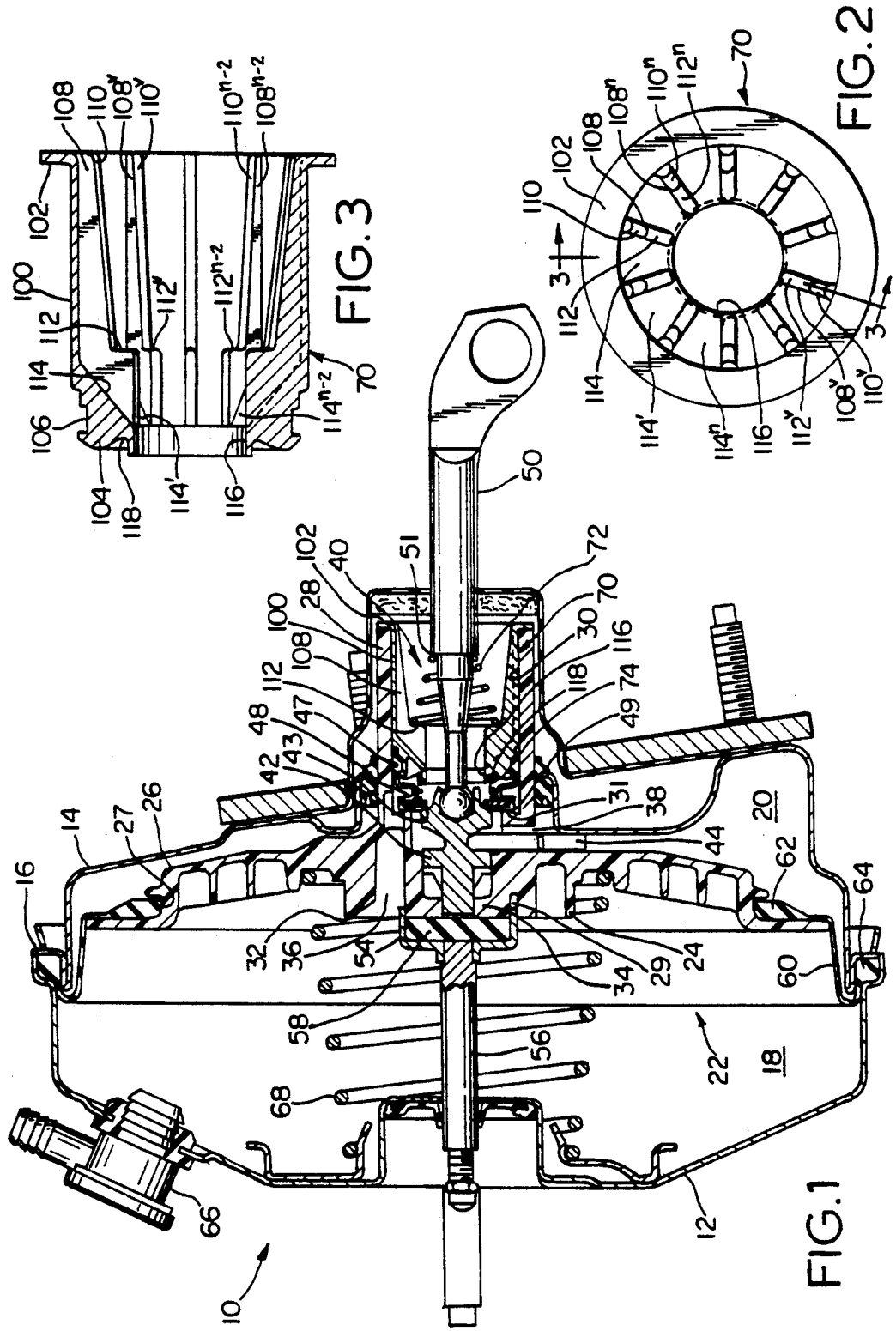

POPPET RETAINER FOR CONTROL VALVE

This invention relates to a retainer for a poppet of a control valve of a brake booster. The retainer has a series of grooves for directing air around a return spring to prevent the creation of turbulence in the air when an input member moves a plunger away from the poppet. The turbulent free air after passing through the poppet is presented to a chamber where a pressure differential is created to develop a uniform output force and effect a smooth brake application.

In brake boosters, such as illustrated in U.S. Pat. No. 4,953,446, a pressure differential is created across a wall that separates a vacuum chamber from a control chamber. The pressure differential acts on the wall to develop an output force corresponding to an input force applied to a control valve. The control valve includes a return spring which urges a plunger toward an atmospheric seat on a poppet member and a seat spring to urge the poppet toward a vacuum seat. The input force is applied to the push rod which compresses the return spring to move the plunger and sequentially allow the seat spring to seat the poppet member on the vacuum seat and the plunger to move away from the poppet member to thereafter allow air to flow to the control chamber. The distance that the push rod moves before the flow of air occurs through the poppet has an effect on the speed of response to effect a brake application. In U.S. Pat. No. 4,953,446 a key member positions the plunger and correspondingly the valve seat such that the poppet spring urges the poppet into engagement with the vacuum seat when the control valve is in the rest position.

It is known that the communication of air through the poppet can effect the uniform development of a pressure differential and as shown in U.S. Pat. No. 4,953,446 a contoured surface is placed on the push rod to reduce the development of turbulence in the air that is supplied to the control chamber.

In analyzing the operation of brake boosters it has been observed that air supplied to the poppet of the control valve must pass through the coils of the return spring. When an input force is applied to the push rod, the coils are compressed and as a result the flow of air is restricted to poppet member.

In the present invention, a retainer holds the poppet member of the control valve in a bore of a hub while positioning the return spring connected to an input member such that air bypasses the return spring by directly flowing through slots to the poppet member. Thereafter, even though the return spring may be completely compressed, the flow of air for distribution to control chamber is substantially turbulent free when an input force moves a plunger of the control valve away from the poppet member.

It is an object of this invention to provide a control valve for a brake booster with a poppet retainer through which substantially turbulent free air is presented to the poppet member for distribution to a control chamber.

It is a further object of this invention to provide a retainer member for a control valve whereby the flow of operational air does not pass through the return spring.

It is another object of this invention to provide a control valve with a retainer having a series of slots formed by a plurality of inwardly projecting walls that extend from a first end toward an annular shoulder adjacent a second end, the peripheral surface of the walls have a ledge for retaining one end of a return spring while the other end of the return spring is connected to an input push rod, the slots direct the flow of air to a poppet member for communication to a control chamber in response to an input force being applied to the push rod.

These objects and advantages should be apparent from reading this specification while viewing the drawings wherein:

FIG. 1 is a schematic illustration of a brake booster wherein the poppet member of the control valve is retained in a hub extending from a movable wall to allow substantially turbulent free air to be presented to a control chamber during a brake application in accordance with the principles of this invention;

FIG. 2 is an end view of the input end of the retainer of FIG. 1; and

FIG. 3 is a sectional view taken along line 3—3 of FIG. 2.

FIG. 1 illustrates a typical single brake booster 10 of a type disclosed in U.S. patent application 843,678 wherein a front shell 12 is joined to a rear shell 14 by a twist lock arrangement 16 to form a unitary structure. A wall 22 which includes a radial disc 26 and diaphragm 60 divides the interior of the unitary structure into a front chamber 18 and a rear chamber 20. The radial disc 26 has an integral central hub 24 and a cylindrical projection 28 that extends through the rear shell 14. The diaphragm 60 has a first bead 62 located in a groove 27 on the radial disc 26 and a second bead 64 that is confined by the twist lock arrangement 16 to assure that the front 18 and rear 20 chambers are separated from each other and the environment. The central hub 24 and cylindrical projection 28 have an axial bore 30 which extend therethrough. The front of the central hub 24 has a face 32 with an annular groove 29 that surrounds a bearing surface 34 that extends inward into the axial bore 30. The central hub 24 has a first passageway 36 that extends from the front face 32 to an annular vacuum seat 31 in the axial bore 30 and a second passageway 38 that extends from the axial bore 30 through the cylindrical body 28. The annular groove 29 receives head 54 on output push rod 56 that surrounds reaction disc 58. Head 54 communicates an output force developed through movement of the wall 22 by a pressure differential between chambers 18 and 20 to output rod 56 connected to pistons in a master cylinder.

The development of the output force is controlled by a control valve 40 located in bore 30 that responds to an input force applied to push rod 50. The control valve 40 has a plunger 42 which is retained in bore 30 by a key member 44 of the type disclosed in U.S. Pat. No. 4,953,446 and a poppet member 48 which is retained in bore 30 by a retainer member 70. A valve return spring 72 caged between the retainer member 70 and shoulder 51 on push rod 50 urges the plunger 42 toward the poppet member 48 while a poppet spring 74 urges face 49 on poppet member 48 toward an annular atmospheric seat 43 on plunger 42.

The retainer member 70 as best shown in FIGS. 2 and 3 has a cylindrical body 100 with an outward flange 102 on a first end and an end wall 104 on a second end. A groove 106 adjacent the second end of retainer 100 engages bead 47 on poppet 48 to position poppet member 48 in bore 30 when flange 102 engages the end of cylindrical body 28. The interior of the cylindrical body 100 has a plurality of radial walls 108, 108' ... 108$^N$ that extend inward. The radial walls 108, 108' ... 108$^N$ have corresponding peripheral faces 110, 110' ... 100$^N$ that extend on a slope to annular ledges 112, 112' ... 112$^N$ that form a shoulder adjacent the end wall 104. End wall 104 has sloped surfaces 114, 114' ... 114$^N$ that extend from the cylindrical body 100 and form a contoured flow path from the slots formed by the radial walls 108, 108' ... 108$^N$ walls to the cylindrical opening 116 which communicated to the poppet member 48. End wall 104 has a groove 118 for retention of the poppet spring 74 while return spring 72 is located on the shoulder formed by annular ledges 112, 112' ... 112$^N$.

The brake booster 10 is located in a vehicle with chamber 18 connected to the intake manifold of an internal combustion engine through check valve 66. When the engine is in operation, vacuum is produced at the intake manifold which evacuates air from chambers 18 and 20 to allow return spring 68 to position wall 22 as shown in FIG. 1. When an operator desires to effect a brake application, an input force is applied to a brake pedal which overcomes return spring 74 and linearly moves push rod 50 and plunger 42. Initial movement of plunger 42 allows poppet spring 74 to urge face 49 on poppet 48 into engagement with vacuum seat 38 on hub 24 to assure that flow communication between the front or vacuum chamber 18 is interrupted with the rear or control chamber 20. Thereafter, annular seat 43 on plunger 42 moves away from an atmospheric seat on face 49 on poppet member 48 and allows air to flow from the environment along a flow path formed by the slots in retainer 70 to poppet member 48 for distribution to the rear or control chamber 20 by way of passageway 38. With air in chamber 20 and vacuum in chamber 18, a pressure differential corresponding to the input force is created which develops an output force that acts on wall 22. After overcoming the force of return spring 68, the output force moves wall 22 toward chamber 18. The output force is communicated from wall 22 to head 54 through reaction disc 58 to provide the output rod 56 with the desired force to effect brake application.

During the communication of air to the control or rear chamber 20, smooth flow occurs since the valve return spring 72 is not in the flow path from the environment.

I claim:

1. In a brake booster having a control valve located in a bore throughwhich air is communicated to a chamber to create a pressure differential across a movable wall, said control valve having a return spring located between a retainer and an input member for urging a plunger toward a poppet member, said retainer being characterized by a cylindrical body having passageways formed by a series of axial slots that extend from a first end to an annual wall, said axial slots directly communicating substantially turbulent free air to said poppet member for distribution to said chamber when an input force moves said plunger away from said poppet member.

2. In the brake booster as recited in claim 1 wherein said communication of turbulent free air through said bore primarily occurs without passing through said return spring.

3. In the brake booster as recited in claim 1 wherein said annular wall is characterized by a first groove for retaining a first bead of said poppet member in a bore and a second groove for retaining a poppet spring, said poppet spring urging a second bead on a movable section of said poppet member toward said plunger and a seat.

4. In the brake booster as recited in claim 3 wherein said series of axial slots are characterized by radial walls that extend on a slope from said first end to an annular shoulder, said return spring being caged between said annular shoulder and input member.

5. In the brake booster as recited in claim 4 wherein said annular shoulder includes an end wall with a slope thereon which aids in directing air from the slots to said poppet without turbulence.

6. In a brake booster having a control valve located in a bore of a cylindrical projection extending from a hub member, said hub member being connected to a wall which divides the interior of the brake booster into a front chamber and a rear chamber, said control valve responding to an input force for allowing air to flow to the rear chamber to develop a pressure differential across the wall with vacuum in the front chamber, said pressure differential acting on the wall to create an output force which is communicated through the hub to an output member, said control valve being characterized by a plunger located in the bore, a push rod connected to said plunger, a poppet located in said bore by a retainer, a first spring connected to said retainer to urge said poppet toward a seat to control inner communication between said front and rear chambers, and a second spring connected to said retainer for urging said plunger toward said poppet to control fluid communication between said bore and said rear chamber, said retainer having a cylindrical body with a series of guides for positioning said second spring in said bore, said series of guides directly communicating substantially turbulent free air from the environment to said poppet for distribution to said second chamber without passing through said second spring.

* * * * *